United States Patent [19]

Iben

[11] 3,776,492
[45] Dec. 4, 1973

[54] ON-BOARD CARGO LOADING DEVICE FOR AIRPLANES

[75] Inventor: Kurt-Werner Iben, Ottobrunn, Germany

[73] Assignee: Messerschmitt-Bolkow-Blohm GmbH Gesellschaft mit beschrankter Haftung, Munchen, Germany

[22] Filed: Oct. 15, 1971

[21] Appl. No.: 189,694

[30] Foreign Application Priority Data

Oct. 23, 1970 Germany............P 20 52 192.0

[52] U.S. Cl............................................. 244/137 R
[51] Int. Cl.............................................. B64d 9/00
[58] Field of Search................... 244/137; 214/75 R, 214/75 T; 312/323; 49/197, 199; 212/15, 75, 73

[56] References Cited
UNITED STATES PATENTS

| | | | |
|---|---|---|---|
| 3,478,904 | 11/1969 | Courter | 244/137 R |
| 3,675,739 | 7/1972 | Erlinder | 214/75 T |
| 3,463,334 | 8/1969 | Blakely et al. | 244/137 R |
| 3,552,587 | 1/1971 | Warren | 244/137 R |

FOREIGN PATENTS OR APPLICATIONS 1,233,615  10/1960  France.................. 49/199

Primary Examiner—Duane A. Reger
Assistant Examiner—Galen L. Barefoot
Attorney—Woodhams, Blanchard and Flynn

[57] ABSTRACT

A cargo loading mechanism for use in the cargo compartment of aircraft having an opening in the side thereof providing access to the cargo compartment. A track is secured to the ceiling of the cargo compartment and is aligned with the opening providing access thereto. A carriage is mounted on the track for movement longitudinally therealong toward and away from the opening. A guide frame is pivotally secured to the carriage and has a support adapted to permit a depending downward movement of the guide frame externally of the aircraft from the carriage generally perpendicular to the track when the carriage is positioned adjacent the opening. The guide frame extends generally parallel to the track when it is positioned away from the opening and inside the aircraft. A lift carriage is mounted on the guide frame and is adapted to move between raised and lowered positions when the guide frame is positioned external of the aircraft.

13 Claims, 8 Drawing Figures

PATENTED DEC 4 1973    3,776,492

ON-BOARD CARGO LOADING DEVICE FOR AIRPLANES

The invention relates to an on-board cargo loading device for airplanes with a lifting platform for receiving the cargo, which lifting platform can be lifted approximately from ground level to the level of the cargo compartment floor.

Such devices are intended to make the cargo airplane independent of ground installations since such a ground service is not always assured, particularly not in military operations nor in the cargo service of less developed countries.

So-called load baskets are already known, mainly for helicopters, which load baskets can be moved up and down by cables and on-board winches between the helicopter in the air and the ground. Such free swinging load baskets are, however, intended primarily for emergency use and are not suitable for manual cargo operations since, for example, in case of a strong wind or in case of a sloped parking place for the airplane a precise feeding of the load into the loading hatches is often not possible. On the other hand, it is absolutely necessary, mainly in the loading of light-construction containers, to avoid an uncontrolled tilting, colliding, or other shocks thereto. The same is true also for loading with pallets on which the cargo is often covered only by a net and is therefore relatively unprotected.

An on-board loading device is also already known in which two rails which extend from the loading hatch to the ground are provided, rails support a carriage for movement along same and which carriage holds, for example, carrying equipment for containers or the like. The rails are each constructed of several parts which can be stored in folded condition in the airplane. Aside from the fact that such devices, due to their wide swinging radius, require special storage space, they are also complicated in structure and are heavy and take up, particularly in the airplane, valuable cargo space.

It is the purpose of the present invention to produce a cargo loading device of the type mentioned above which is simple and reliable, has a light weight and requires little room and which can be installed subsequent to manufacture of the airplane, particularly without requiring serious changes in the structure or organization of the airplane.

This purpose is attained, according to the invention, by providing a guide frame which can be moved from an approximately horizontal storage position inside the fuselage into a vertical operating position outside the fuselage, in which guide frame the lifting platform is supported movably by on-board driving motors.

The guide frame itself is not divided and is swung as a whole between its two terminal positions. Such an arrangement is particularly suitable for airplanes which are loaded through tail gates or for airplanes with so-called underground cargo spaces since in these cases the required space for the horizontal storing of the guide frame is readily available. Because of the manufacture of the guide frame as a one-piece structural part, a simple and reliable construction can be realized. Since such a guide frame can be made very flat, the cargo compartment capacity of the airplane is not affected materially. The guide frame is in its operating position a precise guide for the lifting platform so that an exact and shock-free lifting of the cargo from the ground to the loading opening is possible. Particularly, when used as a container loading device, this preciseness is of considerable importance since the inside diameter of the loading opening is selected with only small tolerances with respect to the dimensions of the containers.

The invention provides particularly for a cargo compartment with a lateral opening for loading, namely an underground cargo space, which takes up the lower half of the fuselage, the guide frame in stored position is arranged transversely to the direction of flight, is positioned below the cargo compartment ceiling, and is movable into an operating position which is located laterally of the fuselage. The largest lengthwise dimension of the guide frame is thereby provided by the available width of the cargo compartment. During a container handling operation the bars, of which the guide frame is built, each fit into gaps between the adjacent containers themselves or between the containers and the wall of the fuselage. Also the space which is not filled by the containers is sufficient to permit the driving-out movement of the guide frame.

For supporting the guide frame the invention provides that a guide carriage is hinged to the end of the guide frame which in operating position is the upper end. The guide carriage is guided in rails arranged on the cargo compartment ceiling. This upper end is moved in an outward direction during the driving-out movement along the cargo compartment ceiling, while more or less simultaneously the lower end is lowered until the operating position is achieved.

According to an exemplary embodiment of the invention, the guide carriage has a driving motor which drives the guide carriage through pinions and racks arranged on the cargo compartment ceiling. This driving motor is, for example, an electric motor which is connected to the on-board current supply.

Also for supporting the lifting platform the invention provides a lift carriage which is supported in the lateral bars of the guide frame, which bars are constructed as rails. Further, the invention provides that the lift carriage carrying the lifting platform is carried by cables which can be drawn in by on-board winches. Such winch systems are common and need therefore not be described in detail. According to a further characteristic of the invention, the lift carriage can be locked in its lower end position in the guide frame. In this manner it is possible to use the winches not only for operating the lifting platform but also for lifting the lower end of the guide frame during the retracting process.

In order to effect storage of the entire device directly below the cargo compartment ceiling, the invention provides further that the lifting platform consists of at least two individual parts which are connected by hinges and which can be folded.

To lock the guide frame in its operating position, support bars are hinged to the two side bars, which support bars can be connected to the fuselage. Thus there is obtained for each side bar of the guide frame a statically determined triangle connection, between the suspension point of the guide frame, the hinge point of the support bar and the connecting point to the fuselage. This permits a precise guiding of the lifting platform.

Furthermore the invention provides that the lifting platform has its own active conveyer roller system so that the cargo can be moved onto the lifting platform without manual labor. To further simplify the operation, the invention provides a standing platform for the operating personnel suspendable on the guide frame approximately at the level of the cargo compartment floor and provides further a control panel or the like which can be reached from said service platform. In another exemplary embodiment of the invention, the invention provides a switch box for controlling the moving-in and moving-out process of the guide frame and for operating the lifting platform, which switch box extends on a cable to the ground.

One exemplary embodiment of the invention is illustrated in the drawings and is described more in detail hereinafter.

In the drawings:

FIGS. 1 to 3 each are a cross section of an airplane fuselage in the zone of the cargo loading device showing various phases of the driving out movement;

Figure 1:
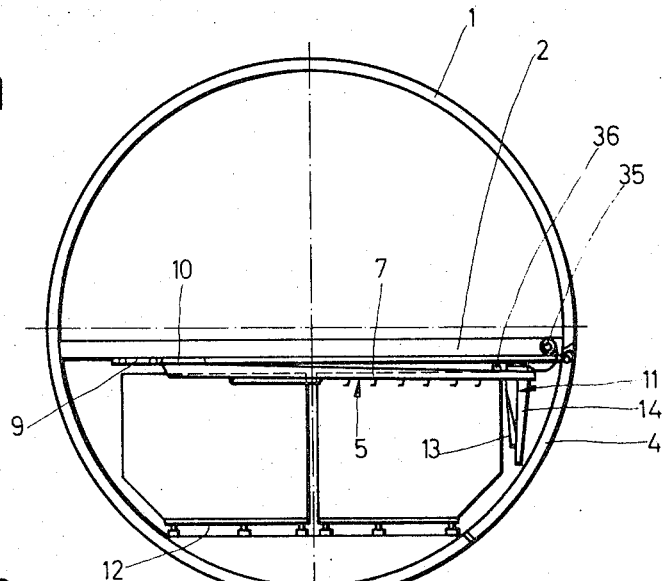
Figure 2:
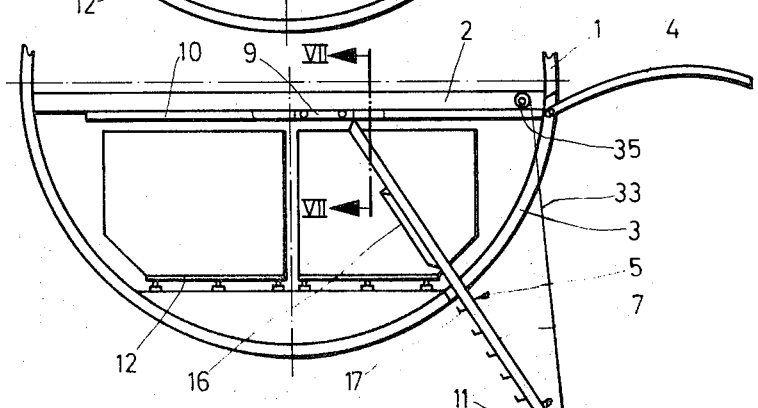
Figure 3:
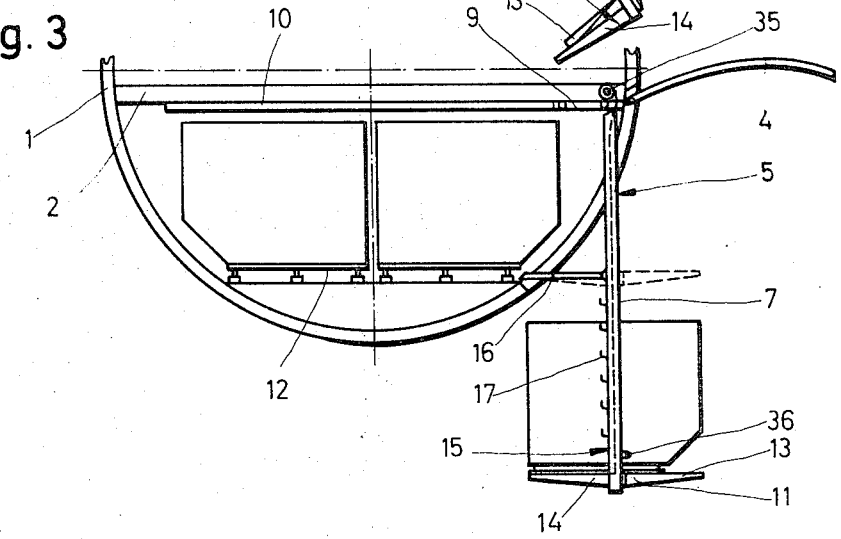
Figure 4:
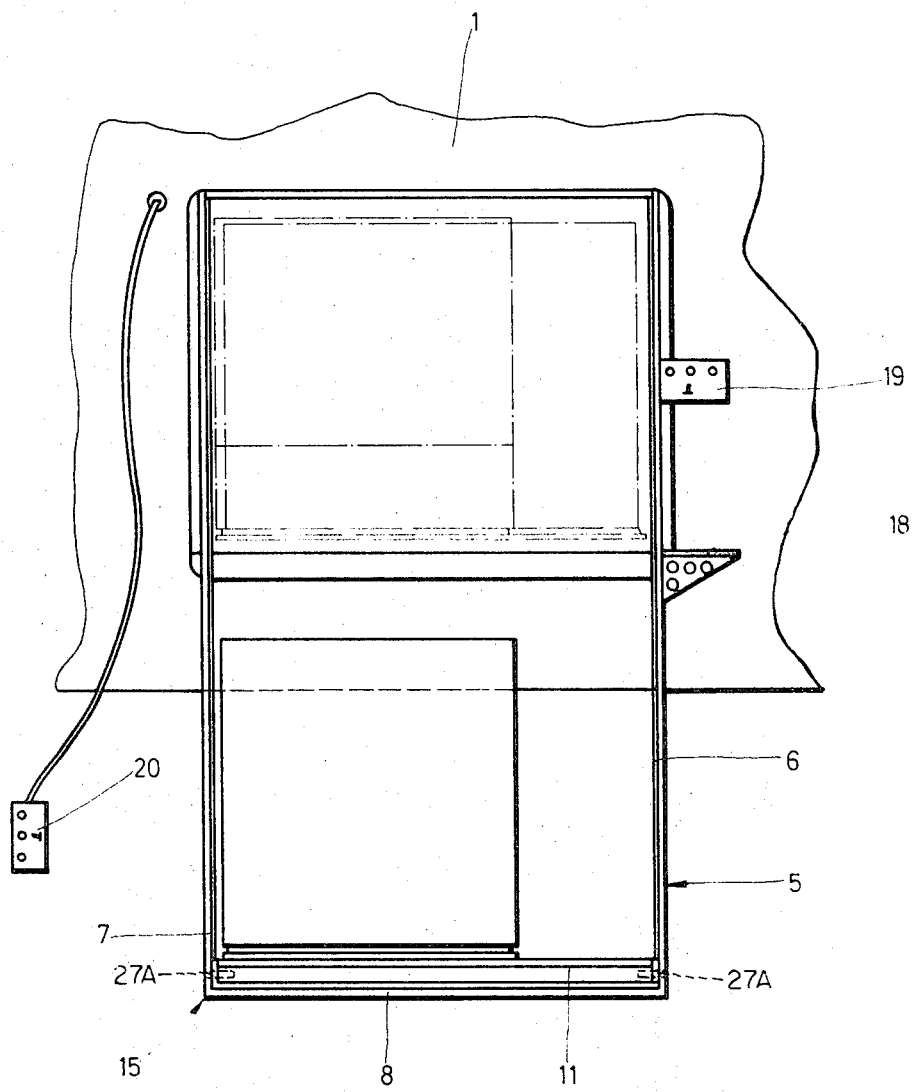
FIG. 4 is a front view of a device arranged on the side of the fuselage according to FIGS. 1 to 3.
Figure 7:
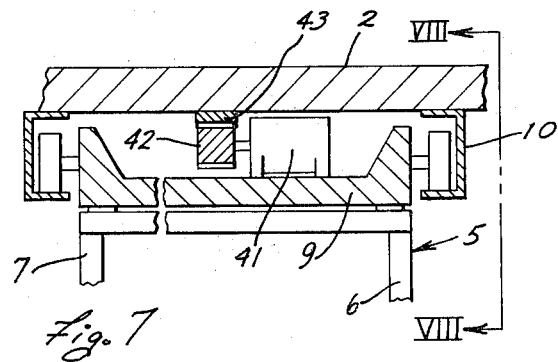
FIG. 7 is a partially broken sectional view taken on the lines VII—VII of FIG. 2 primarily for the purpose of showing the relationship of the carriage to the rest of the apparatus.
Figure 8:
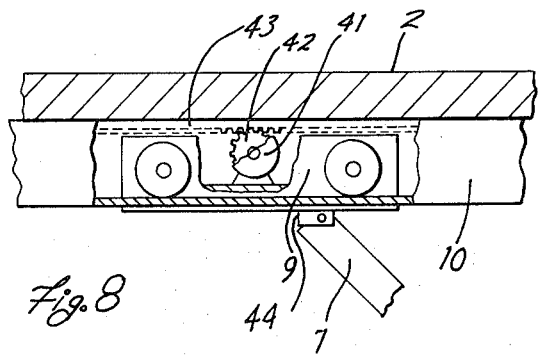
FIG. 8 is a partially broken view taken on the line VIII—VIII of FIG. 7, a support rail being broken away to show the carriage and a portion of the motor on the carriage being broken away to show the drive pinion.

FIG. 1 illustrates schematically the arrangement of the cargo loading device in an airplane with a so-called underground cargo space. The cargo compartment ceiling 2 which is provided in the fuselage 1 divides the fuselage for example into an upper passenger compartment and an underground cargo compartment. This cargo compartment is accessible through a loading opening 3 which can be closed by a cover 4. As is particularly illustrated in FIG. 4, the cargo loading device 5 consists of two lateral bars 6, 7, the lower ends of which are connected by a crossbeam 8 and the upper ends of which are hinged, as at 44 (FIG. 8), to a carriage 9 (FIGS. 1–3). This carriage is supported movably on two rails 10 which are arranged on the cargo compartment ceiling 2, and may carry therein a motor 41 (FIGS. 7–8) for driving said carriage along the rails 10 by any convenient means, such as by a pinion 42 acting on a rack 43.

The lateral bars 6, 7 are constructed as guide rails for the movably supported lifting platform 11. The lifting platform can be moved from a lower loading position into an upper transfer position. The height of the loading position corresponds approximately to the loading surface height of common trucks while the lifting platform in its transfer position is exactly at the height of the cargo compartment floor 12. It should not however approach closer to the ground then the position which it will occupy as determined by the undercarriage of the aircraft when said aircraft is fully loaded.

For the purpose of better storage, the lifting platform 11 is constructed in two parts whereby the movable part 13 (FIG. 5) can be pivoted with respect to the fixed part 14 as is illustrated in FIGS. 1 and 2. The guide frame 15 (FIG. 4) which consists of the lateral bars 6, 7 and the lower crossbeam 8 can be locked together with the fuselage for better safety against wind stresses in moved-out condition by support bars 16. Through this a statically determined triangle connection is obtained between the suspension point of the guide frame on the carriage 9, the hinge point of the support bars 16 on the guide frame and the suspension point of the support bars on the fuselage. Preferably, the suspension point of the support bars in the fuselage may be made variable so that small lateral inclinations of the airplane due to uneven ground can be balanced out. A number of steps 17 arranged on the guide frame permits the operating personnel to climb onto a standing platform 18 (FIG. 4) from where the cargo loading device can be operated by means of a control panel 19. The operating personnel can also from this point oversee and operate the roller conveyer system which is desirably provided in the airplane so that the entire unloading process can be carried out by one person. In order not to unnecessarily enlarge the storing space required by the guide frame, it is preferably provided that the standing platform and the control panel can be removed and stored elsewhere. Further there is provided a switch box 20 which is suspended by a cable approximately to the ground and which in addition also has the devices for controlling the moving-in and moving-out process of the guide frame. Through this the cargo loading device can be moved by only one person from the storage position into the operating position and the return.

Figure 5:
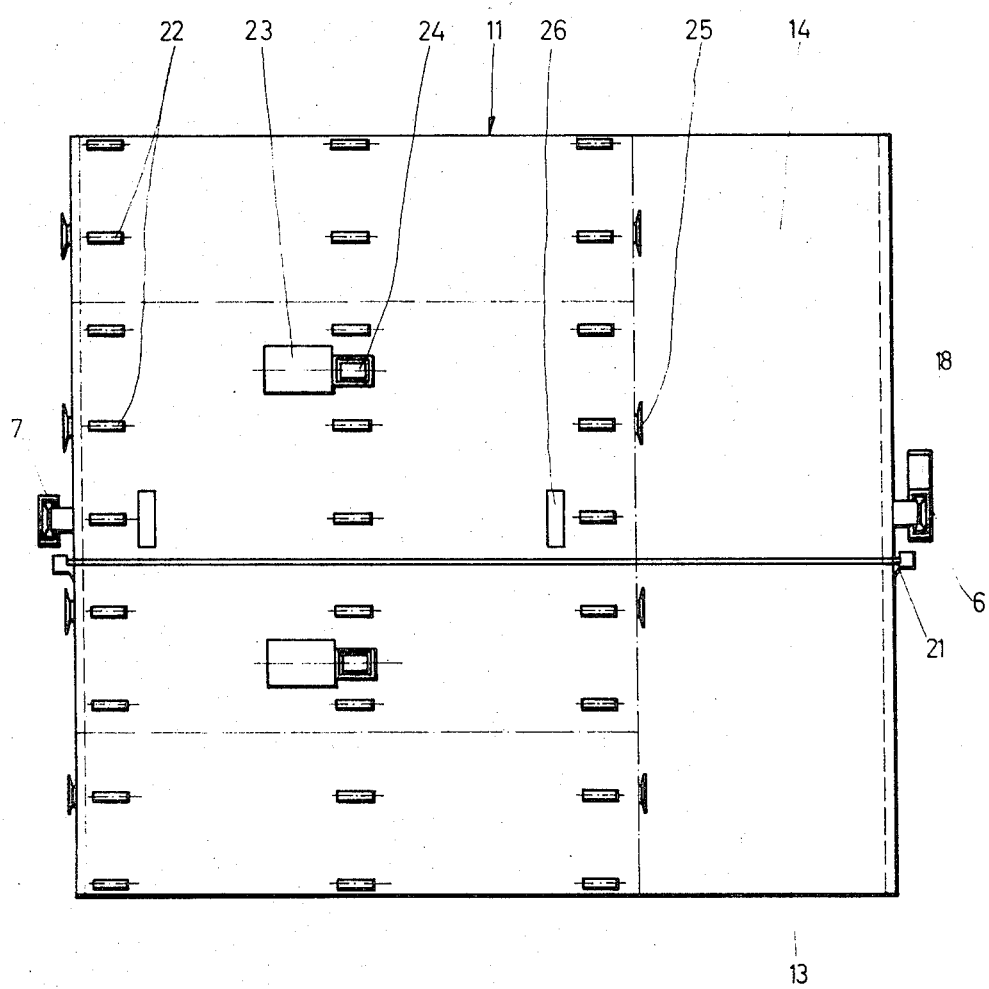
FIG. 5 is a top view of a lifting platform.

FIG. 5 illustrates in an enlarged scale the lifting platform 11 which consists of two individual parts. The part 14 is fixedly connected to a carriage 27 which is guided in the lateral bars 6, 7. The movable part 13 can be tilted about an axis 21 so that it lies on the part 14. The entire lifting platform is provided with conveyer rollers 22 on which the cargo can be moved without great resistance. Several drive rollers 24 which are driven by electric motors 23 make it possible, if desired, that the cargo containers, for example container or pallets, can be moved without external drive means. Since for example the standardized floor areas of light-construction containers and pallets are different, it is further provided that limit rollers 25 are provided for the precise guiding of smaller containers, which rollers can, if necessary, be countersunk. The cargo containers are held during the lifting process on the lifting platform by brakes 26 which are of any conventional type capable of lifting the container or pallet either to obstruct further movement thereof or to lift it off the rollers. Such brake may be controlled in any conventional manner.

Figure 6:
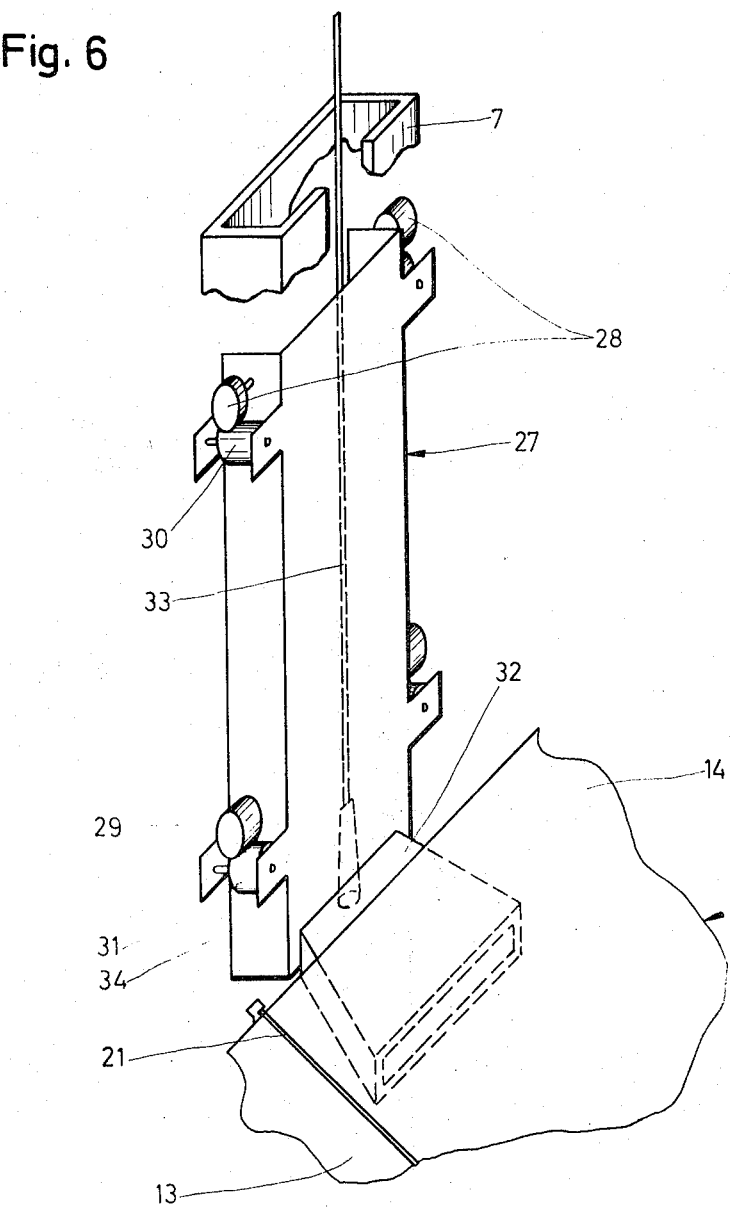
FIG. 6 is a perspective illustration of a detail of the support of the lifting platform.

Details of the lifting platform support in the guide frame 15 are illustrated in FIG. 6. The fixed part 14 of the lifting platform is connected on each side with a lift carriage 27, which is guided in the rail shaped side bars 6, 7. Each lift carriage 27 is supported in the actual plane of the guide frame by two pairs of rollers 28, 29, while for supporting in a normal plane in addition two further pairs of rollers 30, 31 are used of which, because of the perspective illustration, only one roller of each pair can be seen. The lift carriage 27 is provided at its lower end with a support console 32 on which the part 14 of the lifting platform is secured. The part 13 is connected to the part 14 only through its hinges. The lifting platform is driven by two cables which each engage the lift carriage and, which can be drawn in over two synchronously running winches 35 (FIGS. 1 to 3). These winches are also driven by electric motors which are connected to the on-board circuitry. As is illustrated in FIG. 6, the cable 33 is connected to the lift carriage 27 through a sleeve 34.

The lift carriages 27 can be locked as at 27A (FIG. 4) in their lower position if desired, as by connecting each to an adjacent lateral bar 6 and 7. In this manner it is possible to use the lifting device of the lifting platform also for moving the entire cargo loading device into its storage position as illustrated in FIGS. 1 to 3. In such case the motor 41, pinion 42 and rack 43 are omitted and the carriage 9 merely runs free on its rollers. When the carriage 9 is moved in moving-in direction, the cables are simultaneously drawn in over the winches 35 through which the lower end of the guide frame is lifted. In the fully moved-in position (FIG. 1), the lower end of the guide frame can be locked with the cargo compartment ceiling 2 as indicated at 36.

The embodiments of the invention in which an exclusive property or privilege is claimed are defined as follows:

1. A cargo loading mechanism for use in the cargo compartment of a vehicle having an opening in the side thereof providing access to said cargo compartment, comprising:
    elongated and horizontally aligned track means secured to a ceiling in said cargo compartment and is aligned with said opening;
    carriage means mounted on said track means for movement longitudinally therealong in said vehicle toward and away from said opening;
    elongated guide frame means pivotally secured to said carriage means and including support means adapted to permit a depending downward movement of said guide frame means externally of said vehicle from said carriage means generally perpendicular to said track means when said carriage means is positioned adjacent said opening and to permit an extending of said guide frame means generally parallel to said track means when said carriage means is positioned away from said opening; and
    lift carriage means mounted on said guide frame means and adapted to move between raised and lowered positions when said guide frame means is in said depending relationship to transport cargo between said positions.

2. A cargo loading mechanism according to claim 1:
wherein said track means extends transversely of the longitudinal axis of said vehicle; and
wherein said carriage means includes driving means for driving said carriage means along said track means and simultaneously effecting a movement of said guide frame means between said depending and said horizontally aligned positions.

3. A cargo loading mechanism according to claim 2, wherein said support means includes winch means mounted on said vehicle adjacent said opening and aligned with said track means and an elongated cable connected between said winch means and said lift carriage means.

4. A cargo loading mechanism according to claim 3, including securement means for securing said lift carriage means to said guide frame means adjacent the lower end thereof whereby a driven movement of said lift carriage means by said winch means will effect a movement of said guide frame means between horizontally and vertically aligned positions.

5. A cargo loading mechanism according to claim 1, including locking means for locking said guide frame means relative to said track means when said guide frame means is in said horizontally sligned position.

6. A cargo loading mechanism according to claim 5, wherein said lift carriage means includes at least two individual parts which are hingedly connected together for movement between coplanar and overlapping relation.

7. A cargo loading mechanism according to claim 1, including a support bar means intermediate the upper and lower ends of said guide frame means and is adapted to be secured to said vehicle to rigidify said guide frame means when in said depending position.

8. A cargo loading mechanism according to claim 1, wherein said guide frame means includes at least a pair of laterally spaced side bars which define guide rails for said lift carriage means.

9. A cargo loading mechanism according to claim 1, wherein said lift carriage means includes conveyor means thereon.

10. A cargo loading mechanism according to claim 1, including steps on said guide frame means.

11. A cargo loading mechanism according to claim 1, including a platform adjacent said opening for supporting operating personnel, said platform being at a height on said vehicle generally equal to the floor of said cargo compartment.

12. A cargo loading mechanism according to claim 11, including control panel means adjacent said platform, said control panel means being adapted to control the operation of said lift carriage means.

13. A cargo loading mechanism according to claim 12, including a portable control unit and an elongated conduit connecting said control unit to said vehicle, said control unit being adapted to control the operation of said lift carriage means.

* * * * *